US012681930B1

(12) United States Patent
Gu et al.

(10) Patent No.: US 12,681,930 B1
(45) Date of Patent: Jul. 14, 2026

(54) RETRIEVAL AUGMENTED GENERATION

(71) Applicant: Gen Digital Inc., Tempe, AZ (US)

(72) Inventors: Lei Gu, Bedford, MA (US); Iskander Sanchez Rola, Redwood City, CA (US)

(73) Assignee: GEN DIGITAL INC., Tempe, AZ (US)

( * ) Notice: Subject to any disclaimer, the term of this patent is extended or adjusted under 35 U.S.C. 154(b) by 0 days.

(21) Appl. No.: 19/003,448

(22) Filed: Dec. 27, 2024

(51) Int. Cl.
*G06F 16/00* (2019.01)
*G06F 16/23* (2019.01)
*G06F 16/2453* (2019.01)

(52) U.S. Cl.
CPC .... *G06F 16/24539* (2019.01); *G06F 16/2358* (2019.01)

(58) Field of Classification Search
CPC .. G06F 16/2433; G06F 16/248; G06F 16/285; G06F 16/31; G06F 16/335; G06F 16/338; G06F 16/986; G06F 21/577; G06F 40/103; G06F 40/143; G06F 40/35; G06F 40/40; G06F 16/243; G06F 16/2455; G06F 16/3329; G06F 16/383; G06F 40/211; G06N 20/00; G06N 3/08; G06N 5/04; G06N 3/045; G06N 3/098; G06N 5/022; G06N 5/043; G06N 3/00; G06N 3/042

See application file for complete search history.

(56) References Cited

U.S. PATENT DOCUMENTS

| | | | |
|---|---|---|---|
| 12,423,332 B1 * | 9/2025 | White | G06F 16/285 |
| 2025/0124066 A1 * | 4/2025 | McElvain | G06F 16/335 |
| 2025/0298792 A1 * | 9/2025 | Tongaonkar | G06F 16/2433 |
| 2025/0298962 A1 * | 9/2025 | Pathan | G06F 40/143 |

* cited by examiner

*Primary Examiner* — Shyue Jiunn Hwa
(74) *Attorney, Agent, or Firm* — MASCHOFF BRENNAN

(57) ABSTRACT

In one embodiment, a method may include receiving a first input query from a client device, generating a first set of related queries based on the first input query, executing a search to generate a first response to the first input query, storing the first response, the first input query, and the first set of related queries in a cache such that the first response is associated with the first input query and the first set of related queries, and providing, in response to receiving the first input query, the first response to the client device.

20 Claims, 8 Drawing Sheets

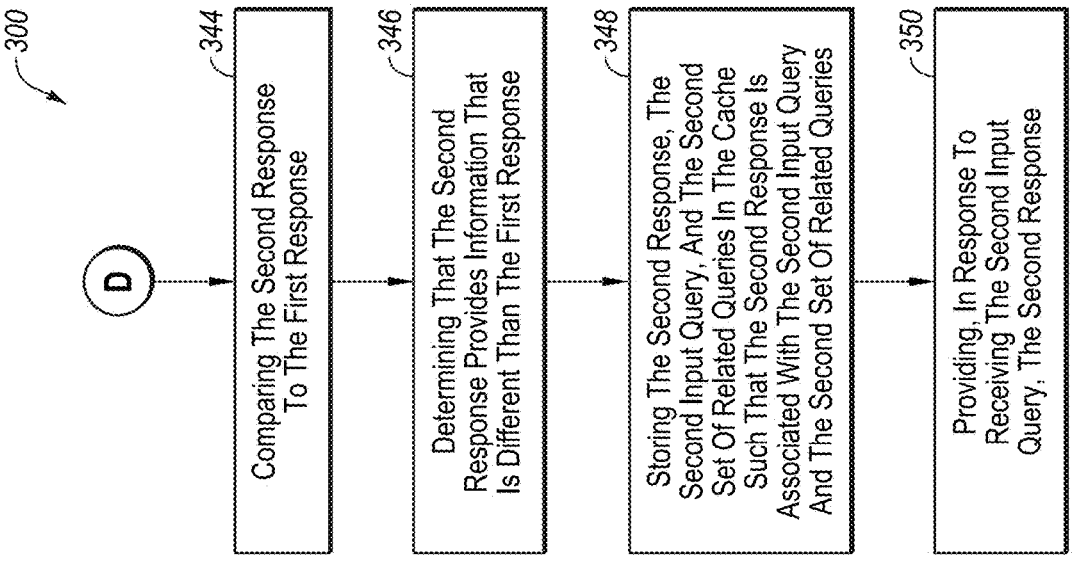

*300*

*344*

Comparing The Second Response To The First Response

*346*

Determining That The Second Response Provides Information That Is Different Than The First Response

*348*

Storing The Second Response, The Second Input Query, And The Second Set Of Related Queries In The Cache Such That The Second Response Is Associated With The Second Input Query And The Second Set Of Related Queries

*350*

Providing, In Response To Receiving The Second Input Query, The Second Response

*FIG. 3E*

RETRIEVAL AUGMENTED GENERATION

BACKGROUND

Retrieval-augmented generation (RAG) systems operate by combining artificial intelligence (AI) response generation capabilities with external knowledge that may not be included in the training data of the AI model. Traditional generative language models, such as transformer-based architectures (e.g., generative pre-trained transformers, or GPTs), rely on encoded pre-trained knowledge. While these models may produce responses to queries, the accuracy of the responses are limited by the extent of the training data of the language model. Furthermore, the response capability of these models is also limited where real-time or up-to-date knowledge is required.

Retrieval augmented generation operates to supplement the shortcomings in the training data of the AI model by combining a retrieval mechanism with the response generation capability of the AI model. RAG allows the generative model to retrieve information from a knowledge base or an external dataset and incorporate the information retrieved into generated responses to user queries. This allows the AI model to produce up-to-date responses to user queries.

One potential problem with current RAG systems is that the AI model may take a significant amount of time to retrieve relevant information from the knowledge base so that the AI model may generate an up-to-date response to the user query with the retrieved information. For example, a user may ask the AI model a question and expect to receive an answer in a short amount of time or almost instantaneously. However, in a RAG system the question may be sanitized, relevant information may be retrieved from the knowledge base, the AI model may generate a response to the question based on the information retrieved from the knowledge base, the response may be checked against a guard rail to ensure that the response is appropriate, and the AI Model may provide the response to the user. This process may take several seconds depending on the various factors like the size of the knowledge base, the length of the input query, and amount of relevant information retrieved from the knowledge base. Consequently, the user must wait for this process to finish until the user receives a response. The waiting time creates inefficiencies and users may be less likely to utilize AI models due to the waiting time.

Therefore, although traditional RAG systems may generally allow AI models to provide responses with more accurate and up-to-date information, the responses may be delayed and users may not utilize RAG systems due to lag between input queries and responses. Thus, there is a trade-off between utilizing AI models without retrieval capability, which may provide fast but inaccurate responses, and utilizing RAG systems which may provide more accurate responses, but may take longer to generate the responses.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for retrieval augmented generation may be performed. The method may include receiving a first input query from a client device, generating a first set of related queries based on the first input query, executing a search to generate a first response to the first input query, storing the first response, the first input query, and the first set of related queries in a cache such that the first response is associated with the first input query and the first set of related queries, and providing, in response to receiving the first input query, the first response to the client device.

In some embodiments, the method may further include receiving a second input query from the client device or a different client device, determining that the second input query matches at least one of the first input query or a related query in the first set of related queries stored in the cache, and providing, in response to receiving the second input query, the first response without executing a second search.

In some embodiments, the method may further include receiving a second input query from the client device or a different client device, determining that the second input query does not match the first input query and any of the related queries in the first set of related queries stored in the cache, generating a second set of related queries based on the second input query, and executing a second search to generate a second response to the second input query.

In these embodiments, the method may further include comparing the second response to the first response, determining that the second response provides information that is the same as the first response, storing the second input query and the second set of related queries in the cache such that the first response is associated with the second input query and the second set of related queries, and providing, in response to receiving the second input query, the first response. Also, in these embodiments, the method may further include, comparing the second response to the first response, determining that the second response provides information that is different than the first response, storing the second response, the second input query, and the second set of related queries in the cache such that the second response is associated with the second input query and the second set of related queries, and providing, in response to receiving the second input query, the second response.

In some embodiments, the method may include receiving a second input query from the client device or a different client device, determining that the second input query matches at least one of the first input query or a related query in the first set of related queries stored in the cache, determining that the first response is current, and providing, in response to the second input query, the first response without executing a second search.

In these embodiments, the determination that the first response is current may be based on a determination that a reference location has not been updated—the reference location being a source of information utilized to generate the first response. Also, in these embodiments, the determination that the first response is current may be based on a determination that a reference location has not expired—the reference location being a source of information utilized to generate the first response.

In some embodiments, the method may further include receiving a second input query from the client device or a different client device, determining that the second input query matches at least one of the first input query or a related query in the first set of related queries stored in the cache, determining that the first response is not current, executing a second search to generate an updated first response to the second input query, storing the updated first response in the cache such that the updated first response is associated with the first input query and the first set of related queries stored in the cache, and providing, in response to receiving the second input query, the updated first response.

In some embodiments, one or more non-transitory computer-readable media may comprise one or more computer-readable instructions that, when executed by one or more processors of a computing device, cause the computing device to perform a method for retrieval augmented generation.

In some embodiments, a computing device comprising one or more processors and one or more non-transitory computer-readable media comprising one or more computer-readable instructions that, when executed by the one or more processors, may cause the computing device to perform a method for retrieval augmented generation.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings, in which:

FIGS. 3A-3E are flowcharts of an example method for retrieval augmented generation.

DETAILED DESCRIPTION

Figure 1:
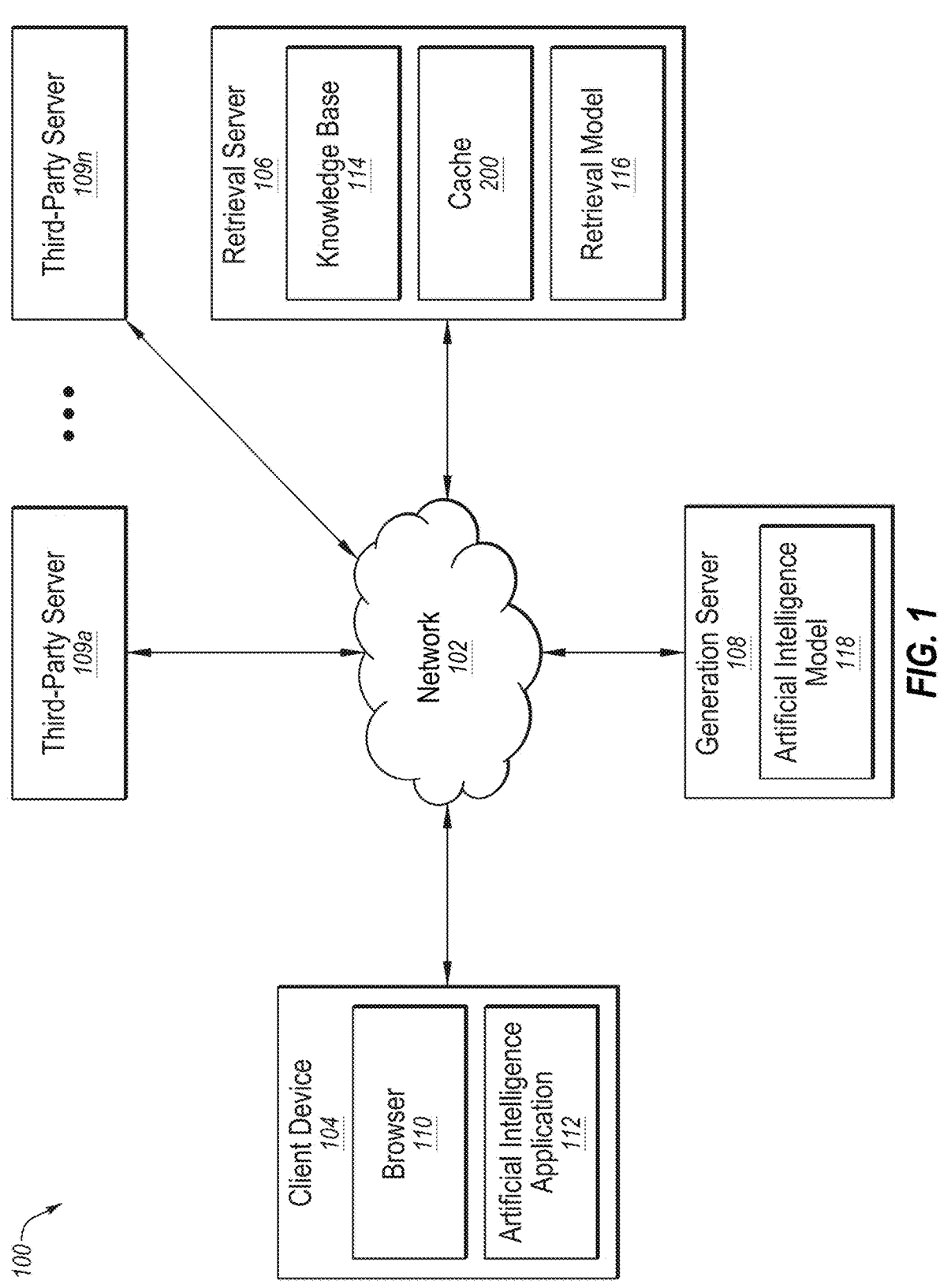
FIG. 1 illustrates an example system configured for retrieval augmented generation utilizing an example cache.

Where retrieval augmented generation is utilized to supplement the generative ability of an artificial intelligence model, one potential problem is the significant delay in searching external sources such as a knowledge base for information so that the AI model may generate an up-to-date answer to an input query. As an example, a user may ask an AI model that that generates responses based on training data alone: "What is the weather like in Hawaii in December?" A RAG system may supplement the training data by searching an external knowledge base (e.g., The Weather Channel® website) to provide an appropriate response that "In December, the weather in Hawaii is warm and mild, with daytime highs around 78-82° F. and occasional light rain." However, the RAG system may take several seconds to produce the response. Because of the delayed response, utilizing other resources like a weather application on a mobile device, going directly to weatherchannel.com, or the like may be quicker and more convenient for the user.

One solution may be to store the input query and the response to the input query in a cache. For example, the input query "What is the weather like in Hawaii in December?" and the response to the input query may be cached such that, if the AI model receives another query asking "What is the weather like in Hawaii in December?", the RAG system would be able to provide the previously generated response that "In December, the weather is warm and mild, with daytime highs around 78-82° F. and occasional light rain." Utilizing a cache may allow the RAG system to perform this task in substantially real-time because the AI model does not have to search the knowledge base again to generate the response. Instead, the exact same query and the associated response may be found in the cache and the response may be provided without performing another search of the knowledge base.

However, users rarely word an input query using the exact same language. For example, there are a variety of ways for a user to ask "What is the weather like in Hawaii in December?" Users may also ask "In December, how is the weather in Hawaii?," "Is the weather nice in Hawaii around Christmastime?," "What is the temperature in Hawaii in December?," and the like.

In these instances, the AI model may not provide the response from the cache because the queries are worded slightly differently and the RAG system may not associate the response in the cache with queries that are slightly different. As a result, despite the response being an appropriate answer to the similar queries, the AI model may have to go through the retrieval process again to generate responses, which may take several seconds.

Another solution may be to provide the cached response to input queries that are similar to the input query which generated the cached response. For example, a question such as "What is the temperature in Hawaii in December" may be deemed to be similar to "What is the weather like in Hawaii in December?" and the cached response may be provided. However, to capture a higher number of ways that the initial input query may be phrased, the similarity threshold may be decreased to a level that would also capture dissimilar queries. For example, a second input query "What is the weather like in December" may be deemed to be similar to the initial input query and generate the cached response, but the cached response may relate to the most recent December weather in Hawaii and not to the weather in December generally so the cached response may not be an accurate or appropriate response to the second input query. As a result, the retrieval process may be faster for some similar queries, but the retrieval process may also be less accurate.

Leveraging the generative capability of retrieval augmented generation systems, some embodiments disclosed herein may enable faster retrieval augmented generation while maintaining the accuracy of the generated responses by generating related queries to an input query and storing the related queries in a cache such that the related queries, in addition to the input query, are associated with a generated response to the input query. In particular, in some embodiments, an input query may be received from a client device and a search may be executed to generate a response to the input query. A set related queries may be generated based on the input query. The response, the input query, and the set of related queries may be stored in a cache such that the input query and the related queries are associated with the response. Because the related queries have been generated and associated with the response in the cache, when another input query is received that matches any of the related queries or the initial input query, the response may be provided without executing a second search. Consequently, the embodiments disclosed herein may improve retrieval augmented generation systems in that related queries may be generated to capture variations of the initial input query for which a response has already been provided. Thus, later received input queries are more likely to match those stored in the cache meaning that a second search need not be performed. As a result, the response generation time may be reduced.

Turning to the figures, FIG. 1 illustrates an example system 100 configured for retrieval augmented generation. The system 100 may include a network 102, a client device 104, a retrieval server 106, a generation server 108, and third-party servers 109a-109n.

In some embodiments, the network 102 may be configured to communicatively couple the client device 104, the retrieval server 106, third-party servers 109a-109n, and the generation server 108. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), a cellular network, the Internet, or some combination thereof.

Figure 4:
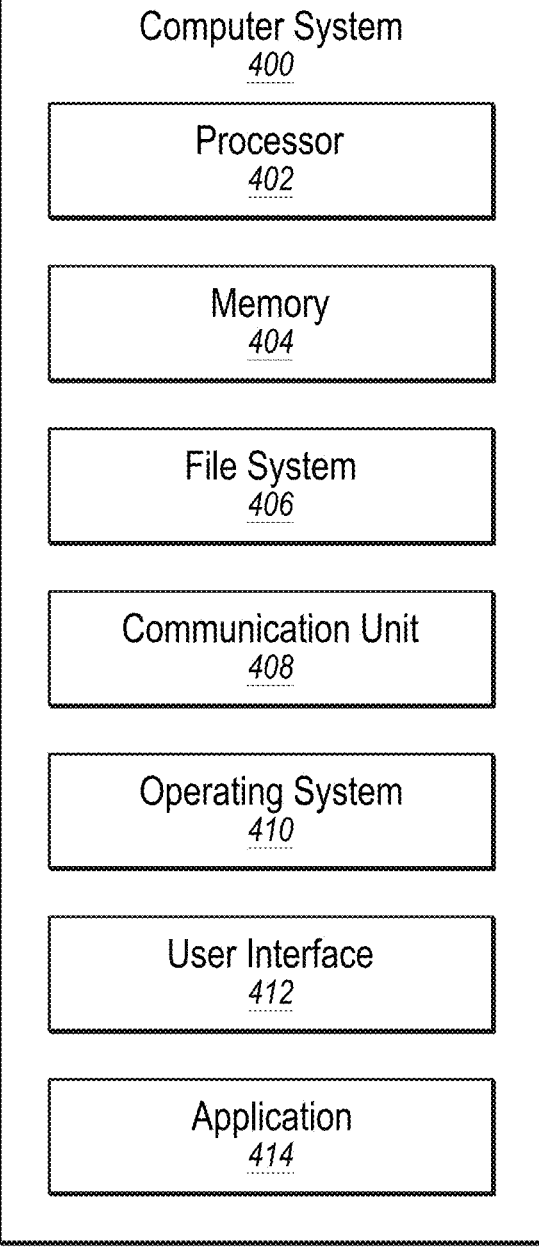
FIG. 4 illustrates an example computer system that may be employed in retrieval augmented generation.

In some embodiments, the client device 104 may be any computer system capable of communicating over the network 102 and capable of providing queries and receiving responses in a retrieval augmented generation (RAG) system, examples of which are disclosed herein in connection with the computer system 400 of FIG. 4. The client device 104 may include a browser 110 and an artificial intelligence application 112. The browser 110 and/or the artificial intelligence application 112 may enable the client device 104 to provide an input query to the retrieval server 106 and/or the generation server 108. For example, the browser 110 may enable the client device 104 to access websites through the network 102, which may allow a user or other systems to interact with an artificial intelligence (AI) model 118 hosted on the generation server 108. In another example, the artificial intelligence application 112 may include a graphical user interface (GUI) which may allow a user to input a query into the artificial intelligence application 112, and the input query may be provided to the AI model 118 from the client device 104 via the network 102.

In some embodiments, the generation server 108 may be any computer system capable of communicating over the network and capable of functioning to generate a response to a received query, examples of which are disclosed herein in connection with the computer system 400 of FIG. 4. The generation server 108 may include the AI model 118.

The AI model 118 may perform one or more operations associated with retrieval augmented generation. For example, the AI model 118 may receive an input query from the client device 104 via the browser 110 and/or the artificial intelligence application 112 and generate a response to the input query. In some embodiments, the AI model 118 may be configured to perform various natural langue processing tasks including generating responses, generating queries, and/or providing context-based language generation from external knowledge sources such as the knowledge base 114 and/or the third-party servers 109a-109n. In some embodiments, the AI model 118 may be a deep learning model (e.g., convolutional neural network, recurrent neural network, transformer models). In these and other embodiments, the AI model 118 may include a generative model such as a large language model or other models capable of generating human-readable language responses and/or queries based on received queries and/or retrieved information. In some of these embodiments, the AI model 118 may be built using a decoder-only transformer-based architecture. In these and other embodiments, the AI model 118 may be part of an artificial intelligence system such as the OpenAIR generative pre-trained transformer (GPT) series of models, Microsoft® Copilot, Google® PaLM Gemini, the Meta® Llama family of open-source models, Anthropic® Claude models, and Mistral AI® open source models, among other artificial intelligence system systems. Additionally or alternatively, the above artificial intelligence systems may be examples of the AI model 118 implemented in the system 100.

In some embodiments, the third-party servers 109a-109n may be any computer system capable of communicating over the network 102, examples of which are disclosed herein in connection with the computer system 400 of FIG. 4. The third-party servers 109a-109n may provide the retrieval server 106 with access to real-time information hosted on the third-party servers 109a-109n (e.g., data from websites), which may be provided to the AI model 118 to aid the AI model 118 in generating a response to an input query.

In some embodiments, the retrieval server 106 may be any computer system capable of communicating over the network 102 and capable of functioning to retrieve information, examples of which are disclosed herein in connection with the computer system 400 of FIG. 4. The retrieval server 106 may include a knowledge base 114, a cache 200, and a retrieval model 116.

The retrieval model 116 may perform one or more operations associated with retrieval augmented generation. In some embodiments, the retrieval model 116 may be a search engine (e.g., OpenSearch® or ElasticSearch®), a vector-based model (e.g., dense vector model, sparse vector model, or a hybrid of both), a semantic search system (e.g., BERT), a keyword search model, a nearest neighbor search model (e.g., FAISS, Annoy), a reinforcement learning-based retrieval model, or any other model capable of searching and/or retrieving information. In some embodiments, the retrieval model 116 may search and retrieve information from the knowledge base 114. In these and other embodiments, the retrieval model 116 may search and retrieve information from the third-party servers 109a-109n. For example, the retrieval model 116 may perform real-time searching of information on the third-party servers 109a-109n. In these and other embodiments, the retrieval model 116 may perform matching or similarity analysis on queries and/or responses stored in the cache 200 and may retrieve matching responses from the cache 200 for provision to the client device 104. In some embodiments, the retrieval model 116 may be an artificial intelligence model such as a machine learning model, a supervised learning model (e.g., regression model, classification model, tree-based model), an unsupervised learning model (e.g., clustering model), and/or a deep learning model (e.g., convolutional neural networks, recurrent neural networks, transformer models), among others. In some embodiments, the retrieval model 116 may leverage techniques such as keyword matching, semantic searching, embedding-based retrieval, or hybrid approaches that combine multiple retrieval mechanisms to search the knowledge base 114 and/or the third-party servers 109 for contextually relevant information to an input query.

The knowledge base 114 may be a repository of information that is used to store, manage, and/or provide access to relevant data for retrieval by the retrieval model 116 during operation of the system. In some embodiments, the knowledge base 114 serves as a source of information from which the AI model 118 may generate a response to an input query. For example, the retrieval model 116 may retrieve information from the knowledge base 114 to provide contextually relevant information to input queries sent to the AI model 118 from, for example, the client device 104. The knowledge base 114 may include information from reference locations such as documents, web pages (e.g., content scraped from websites or webpages such as support pages or frequently asked question pages), spreadsheets, databases, multimedia content (e.g., images, audio, and/or video), search engine results, external APIS, real-time data feeds, or any other content source that may provide relevant data to aid the AI model 118 in generating a response to an input query. In some embodiments, the information stored in the knowledge base 114 may be in the form of structured data, unstructured data, or semi-structured data.

The cache 200 may be a memory storage, which may store query data, response data, and/or reference location data. For example, the cache 200 may be a RAM-based cache, a disk-based cache, a database cache, or any other cache capable of storing data. In some embodiments, the cache 200 may store input queries received from the client device 104 and/or queries generated by the AI model 118. In some embodiments, the cache 200 may store responses generated by the AI model 118. For example, the cache 200 may store a response generated by the AI model 118 to an input query received from the client device 104 (or a different client device) and/or the cache 200 may store a set of related queries generated by the AI model 118. In some embodiments, the one or more queries stored in the cache 200 may be cache keys and the one or more responses stored in the cache 200 may be cache values, which may be associated with one or more of the cache keys. In some embodiments, the cache 200 may store the queries and/or responses as vectors, strings, hashes, integers, binary, or other any other unique identifiers by which the queries may be associated with responses. The cache 200 is explained in further detail with reference to FIG. 2.

In operation of the example system 100, the AI model 118 may receive a first input query from the client device 104. In some embodiments, the first input query may be received from the browser 110 and/or the artificial intelligence application 112 on the client device 104. For example, a user may input a query such as "Who won the NBA Finals?" into a GUI on the artificial intelligence application 112 and/or the browser 110, and that query may be received by the AI model 118.

The AI model 118 may generate a first set of related queries based on the first input query. In some embodiments, the first set of related queries may be semantically similar (e.g., semantically similar matches) to the first input query. For example, the AI model 118 may generate a first set of related queries to the question "Who won the NBA Finals?", which may include related queries such as "Who are the NBA champions?," "Which team won the NBA Finals," or "NBA Finals winner."

In some embodiments, the first input query may be received by the retrieval model 116 on the retrieval server 106. The retrieval model 116 may execute a search to generate a first response to the first input query. For example, the retrieval model 116 may search the knowledge base 114 and/or the third-party servers 109 for contextually relevant data to the input query "Who won the NBA Finals?" In some embodiments, the retrieval model 116 may provide the contextually relevant data to the AI model 118 to generate the first response to the first input query. For example, the retrieval model 116 may provide data from the knowledge base 114, which indicates that the Boston Celtics won the 2024 NBA Finals.

In some embodiments, the AI model 118 may generate a first response to the first input query. In some embodiments, the AI model 118 may generate the first response based on the search results of the retrieval model 116. For example, the AI model 118 may generate the response "The Boston Celtics won the 2024 NBA Finals" based on the data retrieved by the retrieval model 116. The AI model 118 may provide the first response to the client device 104 via the network 102 in response to receiving the first input query. For example, the AI model 118 may provide the first response to a GUI on the browser 110 and/or the artificial intelligence application 112 of the client device 104 via the network 102.

The first response, the first input query, and the first set of related queries may be stored in the cache 200. The first response may be associated with the first input query and the first set of related queries such that when another submitted query matches the first input query and/or any of the related queries in the first set of related queries stored in the cache 200, the retrieval model 116 may provide the first response to the AI model 118 from the cache 200 without executing another search of the knowledge base 114 and/or the third-party servers 109. For example, the queries "Who won the NBA Finals?", "Who are the NBA champions?," "Which team won the NBA finals?," and "NBA Finals winner" may be stored in the cache 200 and associated with "The Boston Celtics won the 2024 NBA Finals." Thus, if a second input query "Which team won the NBA finals?" is received, the response that "The Boston Celtics won the 2024 NBA finals" may be provided without the retrieval model 116 performing a second search of the knowledge base 114 and/or the third-party servers 109 because the second input query matches one of the queries stored in the cache 200. In some embodiments, the first response may be stored as a cache value and the first input query and each of the related queries may be stored as a cache key and associated with the cache value representing the first response. In these and other embodiments, the first response, the first input query, and/or each of the related queries may be stored as vectors, strings, hashes, integers, binary, or other unique identifiers.

In some embodiments, a second input query may be received from the client device 104 or a different client device by the retrieval model 116. The different client device may perform the same or similar functions to the client device 104, and examples of the different client device are disclosed herein in connection with the computer system 400 of FIG. 4. The retrieval model 116 may determine that the second input query matches either the first input query or a related query in the first set of related queries stored in the cache 200. In these embodiments and other embodiments, the retrieval model 116 may provide (through the AI model 118 or otherwise) the client device 104 or the different client device the first response in response to receiving the second input query without having to perform a second search. For example, "The Boston Celtics won the 2024 NBA Finals" may be provided to the second input query "NBA Finals winner" which matches one of the related queries stored in the cache 200 without the retrieval model 116 having to search the knowledge base 114 or the third-party servers 109 because the retrieval model 116 may retrieve the first response from the cache 200.

In some embodiments, in response to receiving the second input query, the first response may be provided to the client device 104 or a different client device when the second input query is determined to be an exact match to the first input query and/or any of the related queries in the first set of related queries stored in the cache 200. In some embodiments, in response to receiving the second input query, the first response may be provided when the second input query is determined to be a semantically similar match to the first input query and/or any of the related queries in the first set of related queries. In some embodiments, a semantically similar match may be determined where the first input query or any of the related queries in the first set of related queries meet a similarity threshold. For example, the retrieval model 116 may determine the similarity between the second input query and the first input query and/or any of the related queries in the first set of related queries via similarity metrics like cosine similarity, Euclidean distance, Manhattan distance, or any other similarity metric. For example, a similarity threshold may be determined based on cosine similarity, based on Euclidian distance, based on Manhattan distance, or based on any other similarity metric. In these embodiments, if the similarity meets the similarity threshold, the first response may be provided to the second input query. In some embodiments, the similarity may be normalized between 0 and 1 such that the lower the number the lower the similarity. In these embodiments, the similarity threshold may be set between 0.5-1 with 1 indicating an exact or near-exact match, for example.

In some embodiments, the retrieval model 116 may additionally determine whether the first response is current. In some of these embodiments, the determination of whether the first response is current may include determining whether a reference location has been updated and/or whether the reference location has expired. In some embodiments, the reference location may be a source of information utilized to generate the first response (e.g., a source of information in the knowledge base 114). In some embodiments, the retrieval model 116 may determine if any of the responses stored in the cache are current.

In some embodiments, reference location information may be stored in the cache 200. In some embodiments, the reference location information may indicate the source of information (e.g., the reference location) utilized to generate the first response. For example, the first response "The Boston Celtics won the 2024 NBA Finals" may have a URL to a Wikipedia® page utilized to generate the first response. In some embodiments, the retrieval model 116 may determine the reference location information from the reference location utilized to generate the first response and store the reference location information in the cache 200. In some embodiments, the reference location in the knowledge base 114 may be updated (e.g., modified, deleted, or superseded) and the retrieval model 116 may determine that the first response is not current based on the reference location information. For example, the WikiPedia® page may be updated in 2025 to reflect a new NBA Champion and the retrieval model 116 may determine that the first response indicating that the "Boston Celtics won the 2024 NBA Finals" is not current. In some embodiments, the reference location in the knowledge base 114 may not be updated (e.g., the Wikipedia® URL still indicates that the Boston Celtics are the current NBA champion) and the retrieval model 116 may determine that the first response is current based on the reference location information.

In these and other embodiments, the reference location information may include an expiration date of a reference location indicating the time at which the first response is no longer current. The expiration date may be set by the retrieval model 116 and determined from a timestamp representing the date the first response was generated from the reference location. In some embodiments, the expiration date may be 1 day, 1 week, 30 days, 60 days, 90 days, a year, or any other amount of time from when the first response was generated which may indicate that the first response is no longer current. In some embodiments, the expiration date may be determined using the same period of time from response generation for each reference location. In some embodiments, the expiration date may be determined using different periods of time from response generation for different locations. For example, the expiration date of a reference location indicating the definition of a particular word in the dictionary may be further in the future than the expiration date of a different reference location indicating the weekly weather forecast. If the second input query is received at or after the expiration date, the retrieval model 116 may determine that the first response is expired and not current even if the second input query matches one of the first input query or any of the related queries in the first set of related queries. If the second input query is received before the expiration date, the retrieval model 116 may determine that the first response is not expired and is current. In some embodiments, the reference location information may include the version of the knowledge base 114 which the first response was generated from. In some embodiments, the version of the knowledge base 114 which the first response was generated from may be determined by the retrieval model 116. If a new version of the knowledge base 114 is established or the knowledge base 114 is redeployed, the retrieval model 116 may determine that the first response is expired and not current if the first response was generated from a prior version even if the second input query matches one of the first input query or any of the related queries in the first set of related queries. If the knowledge base 114 matches the version of the knowledge base 114 indicated by the reference location information, the retrieval model 116 may determine that the first response is not expired and is current.

In embodiments where the first response is determined to be current, the first response may be provided to the client device 104 or the different client device in response to receiving the second input query without executing a second search. For example, the first response may be provided to the client device 104 or the different client device from the cache 200 in response to receiving the second input query without the retrieval model 116 executing a second search of the knowledge base 114 and/or the third-party servers 109.

In embodiments where the first response is determined not to be current, a second search may be executed to generate an updated first response to the second input query. For example, the retrieval model 116 may search the knowledge base 114 and/or the third-party servers 109 to generate an updated first response to the second input query. For example, the reference location indicating the current NBA champion may be updated to reflect the 2025 NBA champion and the retrieval model 116 may search the reference location to generate an updated first response to the second input query reflecting the 2025 NBA champion.

In these embodiments, the updated first response may be stored in the cache 200 such that the updated first response is associated with the first input query and the first set of related queries stored in the cache 200. In some of these embodiments, the updated first response may be provided to the client device 104 or the different client device in response to receiving the second input query. For example, the updated first response indicating the 2025 NBA champion may be stored in the cache 200 and associated with the first input query and the first set of related queries and provided to the client device 104 in response to receiving the second input query. In addition, the updated first response may be provided to a third input query that matches the first input query or any of the related queries in the first set of related queries without the retrieval model 116 performing another search of the knowledge base 114 and/or the third-party servers 109.

In some embodiments, the retrieval model 116 may determine that the second input query does not match the first input query or any of the related queries stored in the cache 200. In these embodiments, the second input query may be determined to not be a match based on the techniques discussed previously (e.g., Cosine Similarity, Euclidean Distance, Manhattan Distance or any other similarity metric). For example, the second input query may be "Who won the Larry O'Brien trophy?" or "What is the weather like in Hawaii in December?" which may be determined not to be a match of the first input query or any of the first set of related queries stored in the cache 200. In these embodiments, the retrieval model 116 may execute a second search of the knowledge base 114 and/or the third-party servers 109 to generate a second response. In some embodiments, the second response may be generated by the AI model 118.

In some embodiments, the AI model 118 may generate a second set of related queries based on the second input query (e.g., "Who won the Larry O'Brien Championship trophy?" or "Is the weather nice in Hawaii around Christmastime?"). The second set of related queries may be generated in a similar fashion as the first set of related queries.

In some embodiments, the second response may be compared to the first response to determine whether the second response provides information that is the same as the first response or provides information that is different than the first response. In some embodiments, the second response may be compared to the first response via the retrieval model 116 and/or the AI model 118. In some of these embodiments, whether the information is the same or different, may be determined based on the techniques discussed previously or any other similarity metric. For example, similarity (e.g., via Euclidian distance, Manhattan Distance, and/or Cosine Similarity or any other similarity metrics) may be determined between the first response and the second response to determine if the first response and the second response provide information that is the same and/or different. In some embodiments, the similarity thresholds discussed previously may be utilized to determine if the first response and the second response provide information that is the same or different.

In embodiments where the second response provides information that is the same as the first response, the second input query and the second set of related queries may be stored in the cache 200 such that the first response is associated with the second input query and the second set of related queries. For example, the second input query "Who won the Larry O'Brien trophy" may return the second response "The Boston Celtics won the Larry O'Brien trophy when they won the 2024 NBA Finals," which provides information that may be determined to be the same as the first response that "The Boston Celtics won the 2024 NBA Finals." Thus, the second input query and the second set of related queries (e.g., "Who won the Larry O'Brien Championship trophy?") may be stored in the cache 200 such that the first response may be provided in response to receiving a third query which matches the first input query, the second input query, and/or any of the related queries in the first and/or second sets of related queries.

In some of these embodiments, the first set of related queries may be compared to the second set of related queries. In some of these embodiments, the first set of related queries and the second set of related queries may include one or more of the same queries. In some of these embodiments, the queries that are the same between the first set of related queries and the second set of related queries may be provided to the AI model 118 as a template for future generation of sets of related queries.

In some of these embodiments, the first response may be provided to the client device 104 or the different client device in response to receiving the second input query. In some embodiments, the second response may be provided to the client device 104 or the different client device in response to receiving the second input query.

In embodiments where the second response provides information that is different than the first response, the second input query and the second set of related queries may be stored in the cache 200 such that the second response is associated with the second input query and the second set of related queries. For example, the second input query "What is the weather like in Hawaii in December" may return the second response "In December, the weather in Hawaii is warm and mild, with daytime highs around 78-82° F. and occasional light rain," which provides information that is different than the first response "The Boston Celtics won the 2024 NBA Finals." Thus, the second input query and the second set of related queries (e.g., including "Is the weather nice in Hawaii around Christmastime") may be stored in the cache 200 such that the second response may be provided when a third query is received which matches the second input query and/or any of the related queries in the second set of related queries.

In some embodiments, the retrieval model 116 and/or the AI model 118 may determine how often individual queries stored in the cache 200 match input queries received from the client device 104 or different client devices. In some embodiments, the queries with a higher frequency of matching input queries may be provided to the AI model 118 as a template for generation of sets of related queries.

In embodiments where a response is provided from the cache 200, the AI model 118 may receive feedback data from the client device 104 based on the provided response. For example, the user may input feedback (e.g., thumbs up/thumbs down, 1-5 stars, etc.) into a GUI on the browser 110 or the artificial intelligence application 112. In these embodiments, the similarity threshold may be adjusted based on the feedback data.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. For example, the system 100 may include a different client device that may include a browser such as the browser 110 and/or an artificial intelligence application 112. Also, the retrieval server 106 and the generation server 108 are illustrated as separate servers, however, in some embodiments, the functionality provided by the retrieval server 106 and the generation server 108 may be provided by a single server. In some embodiments, the retrieval model 116 may be included in the generation server 108 or the AI model 118 may be included on the retrieval server 106. In some embodiments, the AI model 118 may include the retrieval model 116 may be included such that the AI model 118 performs both retrieval and generative operations. In some embodiments, the knowledge base 114 may be omitted and the retrieval model 116 may search other sources via the network 102 such as on the third-party servers 109a-109n. In some embodiments, the browser 110 or the artificial intelligence application 112 may be omitted. It is understood that the network connections between the components illustrated in FIG. 1 (illustrated as left-right arrows) may be part of the network 102 or another network.

Figure 2:
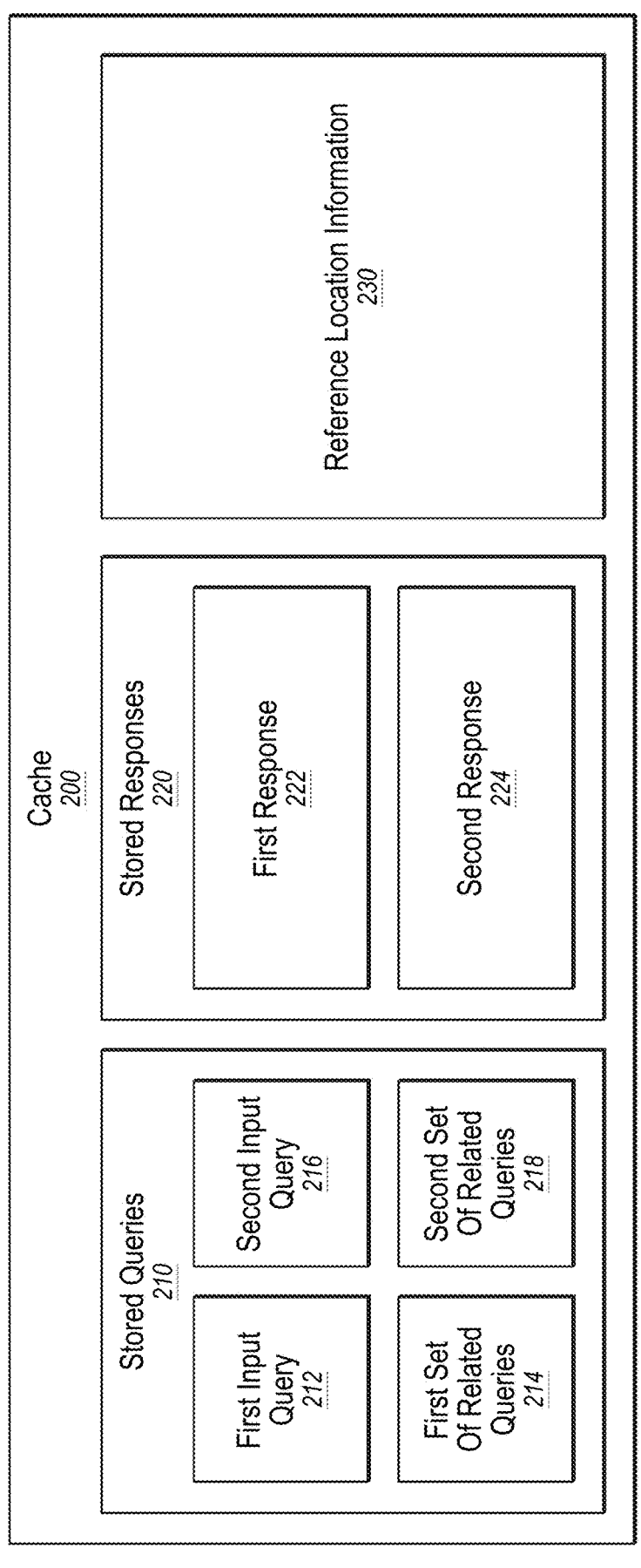
FIG. 2 illustrates the example cache of FIG. 1.

FIG. 2 illustrates the example cache 200 of FIG. 1. The cache 200 may include stored queries 210, stored responses 220, and reference location information 230. The stored queries 210 may include the first input query 212, the first set of related queries 214, the second input query 216, and/or the second set of related queries 218. The stored responses 220 may include the first response 222 and/or the second response 224.

In some embodiments, the stored queries 210 may be cache keys and the stored responses 220 may be cache values, which may be associated with one or more of the cache keys. In some embodiments, the stored queries 210 and/or the stored responses 220 may be stored in the cache 200 as vectors, strings, hashes, integers, binary, or other unique identifiers.

The reference location information 230 may include information pertaining to one or more reference locations utilized to generate the stored responses 220. In some embodiments, the reference location information 230 may pertain to one or more reference locations (e.g., documents, webpages, data, etc.) in the knowledge base 114. In some embodiments, the retrieval model 116 may determine the reference location information 230 from the reference location utilized to generate the stored responses 220 and store the reference location information in the cache 200. In these and other embodiments, the reference location information 230 may include a URL to a reference location, a knowledge base version associated with the reference location, and/or an expiration date of the reference location. In these and other embodiments, the retrieval model 116 may determine whether one or more of the stored responses 220 are current based on the reference location information 230.

The first input query 212 may be received from the client device 104. For example, the first input query 212 may be a question asking "Who won the NBA finals?" input into a graphical user interface of the browser 110 or the artificial intelligence application 112.

The first response 222 may be a generated response to the first input query 212. For example, the first response 222 may be an answer "The Boston Celtics won the 2024 NBA finals" to the question "Who won the NBA finals?" The first response 222 may be generated by the AI model 118. The AI model 118 may utilize information obtained from executing a search to generate the first response 222. For example, the AI model 118 may utilize information from a reference location obtained from a search performed by the retrieval model 116 to generate the first response 222. In some embodiments, the first response 222 may be provided to the client device 104 in response to receiving the first input query 212.

The first set of related queries 214 may be generated based on the first input query 212. In some embodiments, the first set of related queries 214 may be semantically similar (e.g., semantically similar matches) to the first input query 212. In some embodiments, the first set of related queries 214 may be generated by an AI model. For example, the AI model may generate the first set of related queries 214 which may include related queries to the first input query 212 "Who won the NBA Finals?", such as "Who are the NBA champions?," "Which team won the NBA Finals," or "NBA Finals winner."

In some embodiments, the first set of related queries 214 may be filtered before being stored in the cache 200. In these and other embodiments, the similarity may be determined between the first input query 212 and the first set of related queries 214 via the techniques discussed previously with reference to FIG. 1. In some of these embodiments, related queries in the first set of related queries 214 may be stored in the cache 200 if the related queries meet a similarity threshold. The similarity threshold may be determined as discussed previously with reference to FIG. 1.

The first response 222, the first input query 212, and the first set of related queries 214 may be stored in the cache 200 such that the first response 222 is associated with the first input query 212 and the first set of related queries 214. For example, the first input query 212 (e.g., "Who won the NBA Finals?"), the first set of related queries 214 (e.g., "Who are the NBA champions?," "Which team won the NBA Finals," and "NBA Finals winner"), and the first response 222 (e.g., "The Boston Celtics won the 2024 NBA finals") may be stored in the cache 200. In some embodiments, the first response 222 may be stored as a cache value and the first input query 212, and the first set of related queries 214 may be stored as cache keys associated with the cache value such that a later-received query matching any of the cache keys returns the cache value of the first response 222.

The second input query 216 may be received from the client device 104 or a different client device. For example, the second input query 216 may be input into a GUI of the browser 110 or the artificial intelligence application 112 and received by the AI model 118 via the network 102.

In some embodiments, the second input query 216 may match the first input query 212 or a related query in the first set of related queries 214. In some embodiments, the second input query 216 may be an exact match to the first input query 212 or a related query in the first set of related queries 214. For example, the second input query 216 may be "Which team won the NBA Finals" which may be an exact match to an example related query in the first set of related queries 214. In some embodiments, the second input query 216 may be a semantically similar match to the first input query 212 or a related query in the first set of related queries 214 as discussed with reference to FIG. 1 (e.g., based on Euclidian distance, Manhattan Distance, and/or Cosine Similarity or any other similarity metric).

In these embodiments, in response to receiving the second input query 216, the first response 222 may be provided to the client device 104 or a different client device from the cache 200 without executing a second search because the first response 222 is deemed to be an appropriate response to the second input query 216 based on the similarity between the second input query 216 and the first input query 212 or between the second input query 216 and any of the related queries in the first set of related queries 214. As a result, the response generation time may be reduced for the second input query 216, and the first response 222 to the second input query 216 may be provided in substantially real-time or at an enhanced speed compared to if a second search of the knowledge base 114 and/or the third-party servers 109 was performed. There may be a small lag between when the second input query 216 is received and first response 222 is provided, however, the lag may be due to processing (e.g., by one or more components described with reference to FIG. 1 and/or FIG. 4) and delays corresponding to the lag may still be considered as being part of "real-time."

In some embodiments, the second input query 216 may not match the first input query 212 or any of the related queries in the first set of related queries 214. For example, the second input query 216 may be "What is the weather like in Hawaii in December" or "Who won the Larry O'Brien trophy?" which may not match the first input query 212 or any of the related queries in the first set of related queries 214.

In some of these embodiments, the second set of related queries 218 may be generated based on the second input query 216. The second set of related queries 218 may be generated in a similar manner that the first set of related queries 214 are generated. In some embodiments, the second set of related queries 218 may be semantically similar (e.g., semantically similar matches) to the second input query 216. In some embodiments, the second set of related queries 218 may be generated by the AI model. For example, the AI model may generate the second set of related queries 218 which may include related queries to the second input query 216 "What is the weather like in Hawaii in December" such as, for example, "In December, how is the weather in Hawaii?"

In these and other embodiments, the second response 224 may be a generated response to the second input query 216. For example, the second response 224 may be an answer "In December, the weather in Hawaii is warm and mild, with daytime highs around 78-82° F. and occasional light rain." to the question "What is the weather like in Hawaii in December?" The second response 224 may be generated by an AI model (such as the AI model 118). The AI model may utilize information obtained from executing a search to generate the second response 224. For example, the AI model may utilize information obtained by the retrieval model 116 from a reference location to generate the second response 224.

The second response 224 may be compared to the first response 222 to determine whether the second response 224 provides information that is the same or different than the first response 222. In some embodiments whether the information provided by the second response 224 is the same or different from the information provided by the first response 222, may be determined based on the similarity techniques discussed previously with respect to FIG. 1. For example, similarity (e.g., via Euclidian distance, Manhattan Distance, and/or Cosine Similarity or any other similarity metric) may be determined between the first response 222 and the second response 224 to determine if the first response 222 and the second response 224 provide information that is the same and/or different. In some embodiments, these similarity metrics may be normalized. In another example, the similarity thresholds discussed previously may be utilized to determine if the first response 222 and the second response 224 provide information that is the same or different.

In some embodiments, the second response 224 may provide information that is the same as the first response 222. For example, the second input query 216 may be "Who won the Larry O'Brien trophy?" and the second response 224 may be "The Boston Celtics won the Larry O'Brien trophy when they won the 2024 NBA finals," which provides information that may be determined to be the same as the first response 222 "The Boston Celtics won the 2024 NBA Finals." In some of these embodiments, the first response 222 may be provided to the client device 104 or the different client device in response to receiving the second input query 216. In some embodiments, the second response 224 may be provided to the client device 104 or the different client device in response to receiving the second input query 216.

In the previous example, the first response 222 may be an adequate response to the second input query 216. Thus, the second input query 216 and the second set of related queries 218 (for example, including "Who won the Larry O'Brien Championship trophy?") may be stored in the cache 200 such that the first response 222 is associated with the second input query 216 and the second set of related queries 218. Consequently, when a third input query is received which matches the first input query 212, the second input query 216, and/or any of the related queries in the first set of related queries 214 and/or second set of related queries 218, the first response 222 may be provided from the cache 200 without executing a search of the knowledge base 114 and/or the third-party servers 109. Thus, the response generation time may be reduced and a broader set of related queries (including both the first set of related queries 214 and the second set of related queries 218) may be associated with the first response.

In some embodiments, the second response 224 may provide information that is different than the information provided by the first response 222. For example, the second input query 216 may be "What is the weather like in Hawaii in December?" and the second response 224 may be "In December, the weather in Hawaii is warm and mild, with daytime highs around 78-82° F. and occasional light rain," which provides information that is different than the first response 222 "The Boston Celtics won the 2024 NBA Finals." In these embodiments, the second response 224 may be provided to the client device 104 or the different client device in response to receiving the second input query 216. In some embodiments, the second response 224, the second input query 216, and the second set of related queries 218 may be stored in the cache 200 such that the second response 224 is associated with the second input query 216 and the second set of related queries 218. Consequently, when a third input query is received which matches the second input query 216 and/or any of the related queries in the second set of related queries 218, the second response 224 may be provided from the cache 200 without executing a search. On the other hand, in these embodiments, when a third input query is which matches the first input query 212 and/or any of the related queries in the first set of related queries 214, the first response 222 may be provided from the cache 200 without executing a search.

In some embodiments, the second set of related queries 218 may be filtered before being stored in the cache 200. In these and other embodiments, the similarity may be determined between the second set of related queries 218 and the first input query 212, the first set of related queries 214, and/or the second input query 216 via the techniques discussed previously with reference to FIG. 1. In some of these embodiments, related queries in the second set of related queries 218 may be stored in the cache 200 if the related queries meet a similarity threshold. The similarity threshold may be determined as discussed previously with reference to FIG. 1.

In some embodiments, the currentness of a response in the stored responses 220 may be determined. For example, the currentness of the first response 222 may be determined. In some of these embodiments, the determination of whether the response is current may be based on a determination that a reference location utilized to generate the response has been updated and/or has expired. For example, a first reference location utilized to generate the first response 222 may be updated and/or expired and the first response 222 may be determined not to be current or the first reference location may not be updated and/or unexpired such that the first response 222 is determined to be current.

In some embodiments, reference location information 230 may be determined and/or stored in the cache by the retrieval model 116. In some embodiments, the reference location information 230 may be utilized to determine whether a reference location utilized to generate a stored response is current. In some embodiments, the reference location information 230 may indicate the source of information utilized to generate the response. For example, the reference location information 230 may include a URL to a webpage utilized to generate the first response 222 and/or a URL to a webpage utilized to generate the second response 224. For example, the reference location information 230 may include a URL to a Wikipedia page providing information about NBA Champions utilized to generate the first response 222 that the "The Boston Celtics won the 2024 NBA Finals."

In some embodiments, the reference location information 230 may be used to determine whether a reference location utilized to generate one of the stored responses 220 has been updated. In some embodiments, the reference location information 230 may be used to determine whether a webpage utilized to generate one of the stored responses 220 has been updated. For example, if a first reference location utilized to generate the first response 222 is updated, the first response 222 may be determined to be not current based on the reference location information 230 indicating that the first reference location has been updated. If the reference location information 230 does not indicate that first reference location has been updated, the first response 222 may be determined to be current.

In these and other embodiments, the reference location information 230 may include an expiration date of a reference location indicating the time at which a response is no longer current. In some embodiments, the expiration date may be set by the retrieval model 116 and determined from a timestamp representing the date the response was generated from the reference location. In some embodiments, the expiration date may be 1 day, 1 week, 30 days, 60 days, 90 days, a year, or any other amount of time from when the response was generated which may indicate that the response is no longer current. In some embodiments, the expiration date may be determined using the same period of time from response generation for each reference location. In some embodiments, the expiration date may be determined using different periods of time from response generation for different locations. For example, the expiration date of a reference location indicating the definition of a particular word in the dictionary may be further in the future than the expiration date of a different reference location indicating the weekly weather forecast. Consequently, for input queries received at or after the expiration date, the first response 222 may be determined not current and the first response 222 may not be provided in response to the input queries. For queries received before the expiration date, the first response 222 may be current such that the first response 222 may be provided.

In some embodiments, the reference location information 230 may include the version of the knowledge base 114 associated with the reference locations which the stored responses 220 were generated from. In some embodiments, the version of the knowledge base 114 which the stored responses 220 were generated from may be determined by the retrieval model 116. Consequently, if a new version of the knowledge base 114 is established or the knowledge base 114 is redeployed, each of the stored responses 220 that were generated from a prior version may be determined to be expired and not current. If the knowledge base version for a response such as the first response 222 matches the version of the knowledge base indicated by the reference location information 230, the response may be determined to be current.

In embodiments where the first response 222 is determined to be current, the first response 222 may be provided in response to receiving the second input query 216 without executing a second search where the second input query 216 matches the first input query 212 and/or one of the related queries in the first set of related queries 214 stored in the cache 200. For example, in response to receiving the second input query 216, the first response 222 may be provided from the cache 200 without executing a second search of the knowledge base 114 and/or the third-party servers 109.

In embodiments where the first response 222 is determined not to be current, a second search may be executed to generate an updated first response to the second input query 216. For example, another search of the knowledge base 114 and/or the third-party servers 109 may be executed to generate an updated first response to the second input query 216. For example, the reference location indicating the current NBA champion may be updated to reflect the 2025 NBA champion such that the first response 222 is determined to be no longer current, and a search may be executed to obtain information from the updated reference location to generate an updated first response to the second input query 216 reflecting the 2025 NBA champion.

In these embodiments, the updated first response (not shown) may be stored in the cache 200 such that the updated first response is associated with the first input query 212 and the first set of related queries 214 stored in the cache 200. In some of these embodiments, the updated first response may be provided in response to receiving the second input query 216. For example, the updated first response indicating the 2025 NBA champion may be stored in the cache 200, associated with the first input query 212 and the first set of related queries 214, and provided to the client device 104 or the different client device in response to receiving the second input query 216. In addition, the updated first response may be provided in response to receiving later received input queries that match the first input query 212 or any of the related queries in the first set of related queries 214 without performing an additional search of the knowledge base 114 and/or the third-party servers 109.

Because the first set of related queries 214 are generated for the first input query 212, the cache 200 may store multiple variations of queries that may be received from client devices (e.g., from users using the client devices) in a retrieval augmented generation system. The storage of the first related queries 214 in the cache 200 may provide quicker response generation in RAG systems thereby decreasing the time that a user waits to receive a response because the response may be provided from the cache 200 instead. Additionally, where the second input query 216 does not match the first input query 212 or the first set of related queries 214, the second response 224 generated in response to receiving the second input query 216 may still provide information that is similar to the first response 222. Consequently, the second set of related queries 218 may be generated based on the second input query 216 to provide a more robust dataset of queries for which the first response 222 may be an adequate response. If the second response 224 provides information that is different than the first response 222, the second set of related queries 218 and the second input query 216 may be stored in the cache 200 to provide quicker response generation times for later queries regarding the information provided by the second response 224. As a result, quicker retrieval may be provided in RAG systems for a wide range of subjects, topics, and/or information. Further, the responses may be checked for currentness to ensure that the first response 222 and/or the second response 224 provide accurate and up-to-date information.

Modifications, additions, or omissions may be made to the cache 200 without departing from the scope of the present disclosure. For example, the cache 200 may include additional components similar to the components illustrated in FIG. 2 that each may be configured similarly to the components illustrated in FIG. 2. For example, the cache 200 may include a third query—$n^{th}$ query in the stored queries 210, a third set of related queries—$n^{th}$ set of related queries in the stored queries 210, and/or a third response—$n^{th}$ response in the stored responses 220 depending on the storage capability of the cache 200. In addition, in some embodiments, the reference location information 230 may be omitted.

Furthermore, the use of example related queries to the first input query 212 and the second input query 216, the use of example second queries 216 which match the first input query 212, the use of example second queries which do not match the first input query 212, the use of example second responses 224 that provide information that is the same as the first response 222, and the use of example second responses 224 that provide information that is different than the first response 222 are provided for illustrative purposes. In some embodiments, the examples provided throughout the disclosure may not fall into these respective categories. Furthermore, the examples are not to be construed as limits on how similar queries need to be considered "related," how similar the second input query 216 needs to be to be considered a match to the first input query 212, how similar the second response 224 needs to be to be considered to "provide information that is the same as the first response 222," how dissimilar the second input query 216 needs to be to not be considered a match to the first input query 212, or how dissimilar responses need to be to be to be considered "to provide information that is different than the first response 222."

FIGS. 3A-3E are a flowchart of an example method 300 for retrieval augmented generation. The method 300 may be performed, in some embodiments, by a device or system, such as by the example system 100 of FIG. 1. In these and other embodiments, the method 300 may be performed by one or more processors, such as processor 402 described with respect to FIG. 4, based on one or more computer-readable instructions stored on one or more non-transitory computer-readable media. The method 300 will be described in connection with FIGS. 1, 2, and 3A-3E.

The method 300 may include, at action 302, receiving a first input query from a client device. For example, the first input query 212, at action 302, may be received from the client device 104 at the AI model 118 on the generation server 108 and/or at the retrieval model 116 on the retrieval server 106.

The method 300 may include, at action 304, generating a first set of related queries based on the first input query. For example, the first set of related queries 214, at action 304, may be generated by the AI model 118 based on the first input query 212.

The method 300 may include, at action 306, executing a search to generate a first response to the first input query. For example, the retrieval model 116, at action 306, may execute a search of the knowledge base 114 and/or the third-party servers 109 so that the first response 222 to the first input query 212 may be generated by the AI model 118.

The method 300 may include, at action 308, storing the first response, the first input query, and the first set of related queries in a cache such that the first response is associated with the first input query and the first set of related queries. For example, the first response 222, the first input query 212, and the first set of related queries 214 may be stored in the cache 200 on the retrieval server 106 such that the first response 222 is associated with the first input query 212 and the first set of related queries 214.

The method 300 may include, at action 310, providing, in response to receiving the first input query, the first response to the client device. For example, in response to receiving the first input query 212, the first response 222 may be provided to the client device 104 by the AI model 118 via the network 102.

Figure 3A:
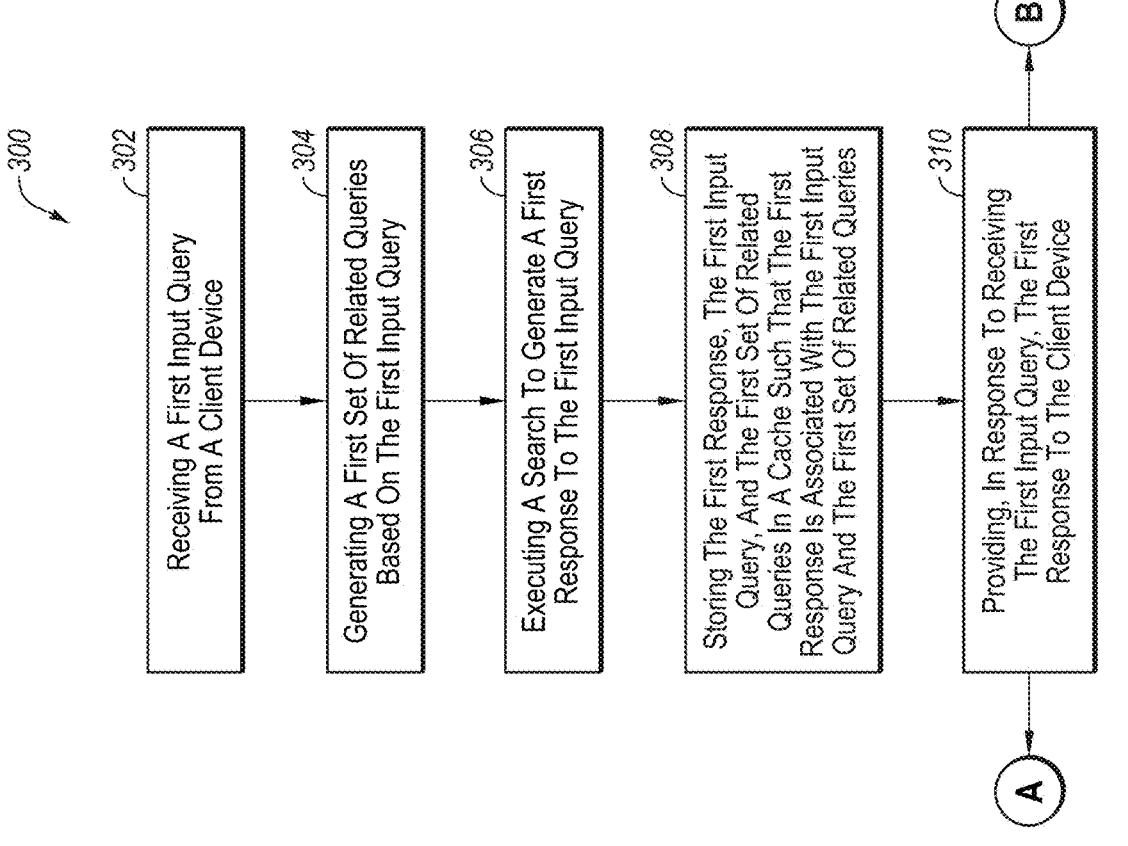
Figure 3B:
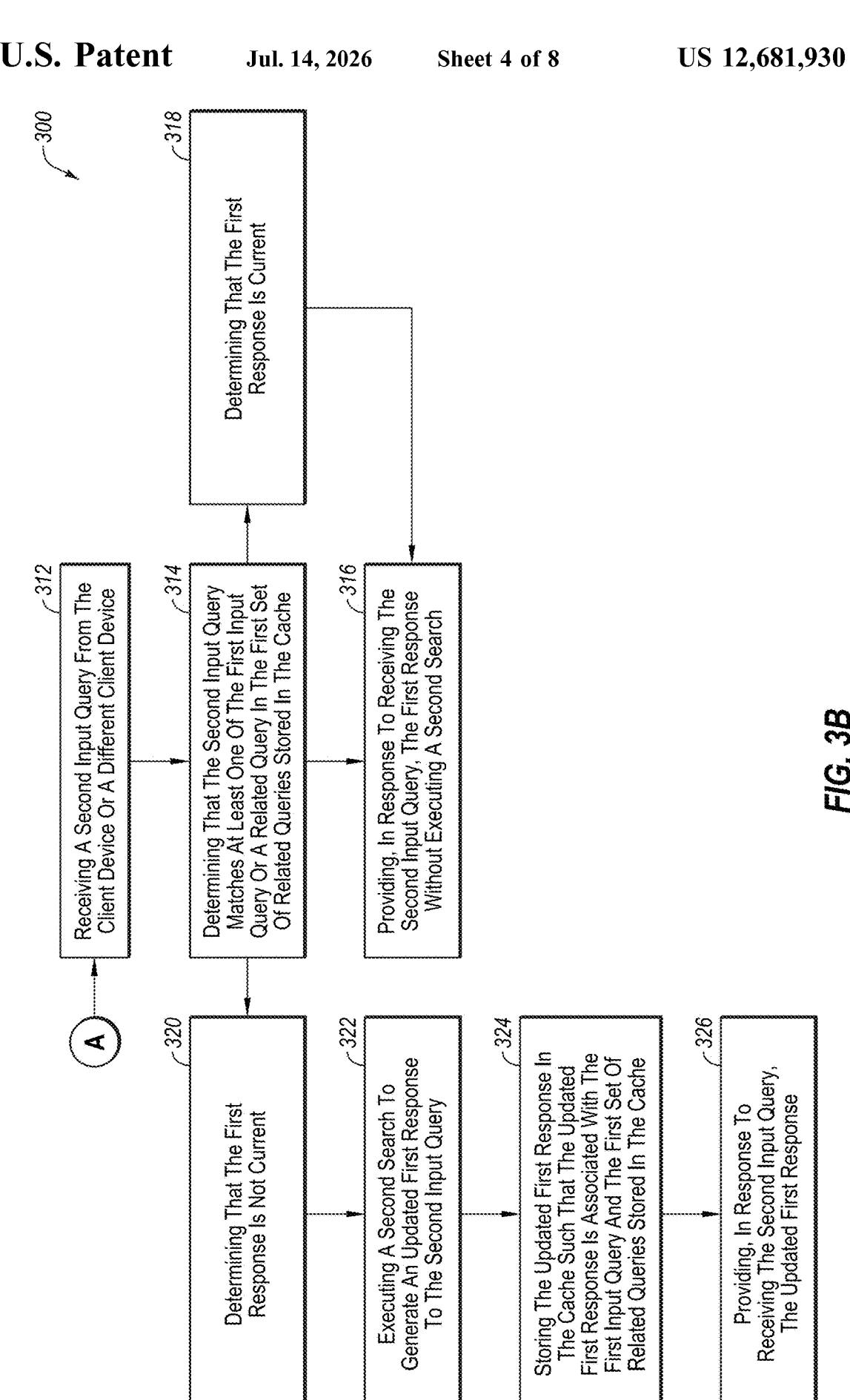

In some embodiments, the method 300 may proceed to one or more of the actions 312-326 illustrated in FIG. 3B. In some embodiments, the method 300 may proceed to one or more of the actions 328-334 illustrated in FIG. 3C.

As illustrated in FIG. 3B, the method 300 may include, at action 312, receiving a second input query from the client device or a different client device. For example, the second input query 216, at action 312, may be received from the client device 104 or from a different client device at the AI model 118 on the generation server 108 and/or at the retrieval model 116 on the retrieval server 106.

The method 300 may include, at action 314, determining that the second input query matches at least one of the first input query or a related query in the first set of related queries stored in the cache. For example, the retrieval model 116, at action 314, may determine that the second input query 216 matches at least one of the first input query 212 or a related query in the first set of related queries 214 stored in the cache 200.

The method 300 may include, at action 316, providing, in response to receiving the second input query, the first response without executing a second search. For example, in response to receiving the second input query 216, the first response 222 may be provided to the client device 104 or the different client device by the AI model 118 via the network 102 without the retrieval model 116 executing a second search of the knowledge base 114 and/or the third-party servers 109.

In some embodiments, prior to action 316, the method 300 may include determining whether the first response is current or not current. In some embodiments, the determination that the first response is current may be based on a determination that a reference location has not been updated—the reference location being a source of information utilized to generate the first response. In some embodiments, the determination that the first response is current may be based on a determination that a reference location has not expired—the reference location being a source of information utilized to generate the first response.

In some of these embodiments, the method 300 may include, at action 318, determining that the first response is current. For example, the retrieval model 116, at action 318, may determine that the first response 222 stored in the cache 200 is current. In these embodiments, after action 318, the method 300 may then proceed to action 316 and provide the first response to the second input query without executing a second search.

In some embodiments, the method 300 may include at action 320, determining that the first response is not current. For example, the retrieval model 116, at action 318, may determine that the first response 222 stored in the cache 200 is not current. In these embodiments, after action 318, the method 300 may proceed to actions 322-226.

The method 300 may include, at action 322, executing a second search to generate an updated first response to the second input query. For example, the retrieval model 116 may execute a second search of the knowledge base 114 and/or the third-party servers 109 to generate an updated first response to the second input query 216.

The method 300 may include, at action 324, storing the updated first response in the cache such that the updated first response is associated with the first input query and the first set of related queries stored in the cache. For example, the updated first response may be stored in the cache 200 such that the updated first response is associated with the first input query 212 and the first set of related queries 214 stored in the cache 200.

The method 300 may include, at action 326, providing, in response to receiving the second input query, the updated first response. For example, in response to receiving the second input query 216, the updated first response may be provided to the client device 104 or the different client device by the AI model 118 via the network 102.

Figure 3C:
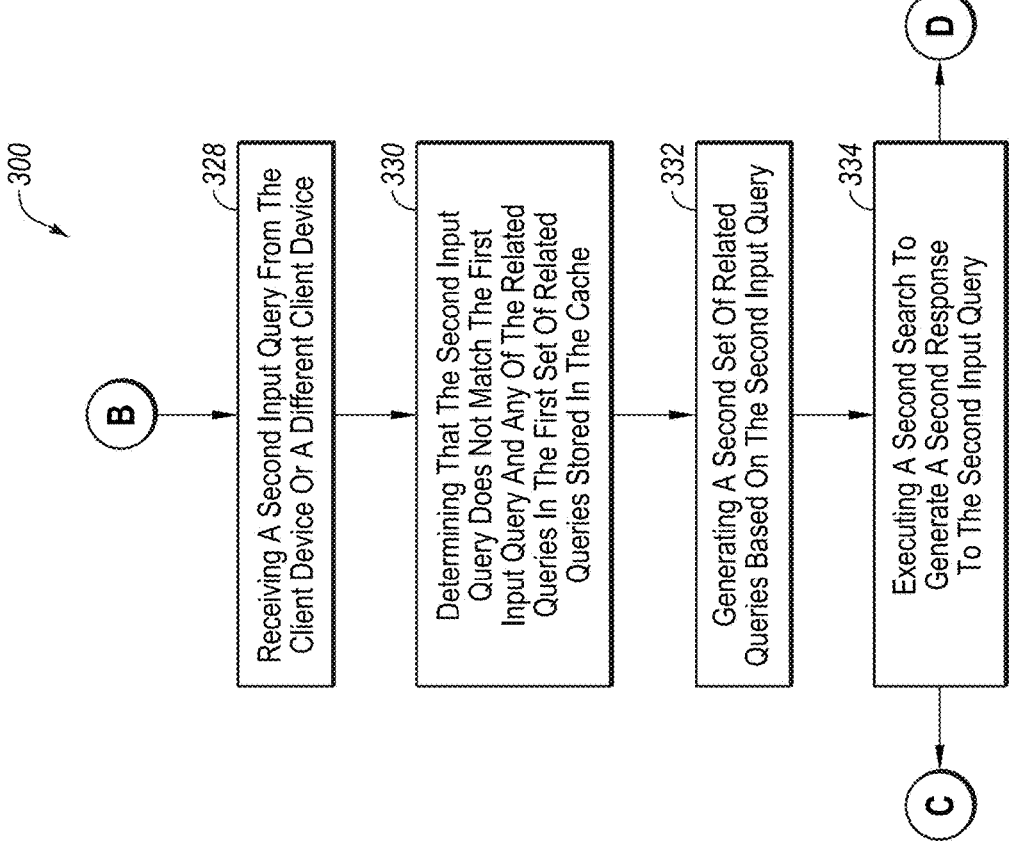

As illustrated in FIG. 3C, the method 300 may include, at action 328, receiving a second input query from the client device or a different client device. Action 328 may be the same or similar to action 312. For example, the second input query 216, at action 328, may be received from the client device 104 or a different client device at the AI model 118 on the generation server 108 and/or at the retrieval model 116 on the retrieval server 106.

The method 300 may include, at action 330, determining that the second input query does not match the first input query and any of the related queries in the first set of related queries stored in the cache. For example, the retrieval model 116, at action 330, may determine that the second input query 216 does not match the first input query 212 or any of the related queries in the first set of related queries 214 stored in the cache 200.

The method 300 may include, at action 332, generating a second set of related queries based on the second input query. For example, the second set of related queries 218, at action 332, may be generated by the AI model 118 based on the second input query 216.

The method 300 may include, at action 334, executing a second search to generate a second response to the second input query. For example, the retrieval model 116, at action 334, may execute a second search of the knowledge base 114 and/or the third-party servers 109 so that the second response 224 to the second input query 216 may be generated by the AI model 118.

Figure 3D:
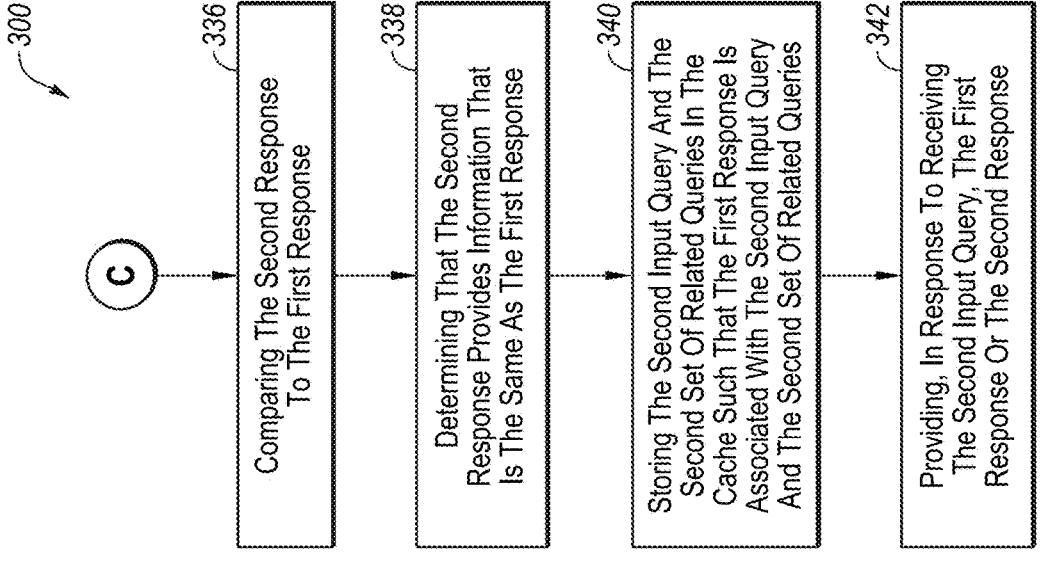

In some embodiments, the method 300, after action 334, may proceed to one or more of the actions 336-342 illustrated in FIG. 3D. In some embodiments, the method 300, after action 334, may proceed to one or more of the actions 344-350 illustrated in FIG. 3E.

As illustrated in FIG. 3D, the method 300 may include, at action 336, comparing the second response to the first response. For example, the retrieval model 116 and/or the AI model 118 may compare the second response 224 to the first response 222.

The method 300 may include, at action 338, determining that the second response provides information that is the same as the first response. For example, the retrieval model 116 and/or the AI model 118 may determine that the second response 224 provides information that is the same as the first response 222.

The method 300 may include, at action 340, storing the second input query and the second set of related queries in the cache such that the first response is associated with the second input query and the second set of related queries. For example, the second input query 216 and the second set of related queries 218 may be stored in the cache 200 such that the first response 222 is associated with the second input query 216 and the second set of related queries 218.

The method 300 may include, at action 342, providing, in response to receiving the second input query, the first response or the second response. For example, in response to receiving the second input query 216, the first response 222 or the second response 224 may be provided to the client device 104 or the different client device by the AI model 118 via the network 102.

As illustrated in FIG. 3E, the method 300 may include, at action 344, comparing the second response to the first response. Action 334 may be similar to action 336. For example, the retrieval model 116 and/or the AI model 118 may compare the second response 224 to the first response 222.

The method 300 may include, at action 346, determining that the second response provides information that is different than the first response. For example, the retrieval model 116 and/or the AI model 118 may determine that the second response 224 provides information that is different than the first response 222.

The method 300 may include, at action 348, storing the second response, the second input query, and the second set of related queries in the cache such that the second response is associated with the second input query and the second set of related queries. For example, the second response 224, the second input query 216, and the second set of related queries 218 may be stored in the cache 200 such that the second response 224 is associated with the second input query 216 and the second set of related queries 218.

The method 300 may include, at action 350, providing, in response to receiving the second input query, the second response. For example, in response to receiving the second input query 216, the second response 224 may be provided to the client device 104 or the different client device by the AI model 118 via the network 102.

The method 300 may thus be employed, in some embodiments, to enhance the speed at which responses are provided to queries received in retrieval augmented generation systems such as the system 100 of FIG. 1. Because related queries are generated based on the received queries and stored in the cache 200 along with the responses to the received queries, future queries may be anticipated and stored before actually being received by the system 100 such that the responses may be provided from the cache 200 instead of the retrieval model 116 searching the knowledge base 114 and/or the third-party servers 109, which may take several seconds. Thus, queries may be responded to at an enhanced speed, and, in some embodiments, in substantially real-time.

Although the actions of the method 300 are illustrated in FIGS. 3A-3B as discrete actions, various actions may be divided into additional actions, combined into fewer actions, reordered, expanded, or eliminated, depending on the desired implementation. For example, in some embodiments, the currentness of the first response may not be determined. Thus, actions 318, and actions 320-326 may be omitted. Furthermore, the generation of the second set of related queries based on the second input query at action 332 may be performed after any of actions 334-342. In some embodiments, action 332 may be omitted. Furthermore, the generation of related queries and the generation of responses may be performed in parallel such that actions 304 and 306 may be combined and actions 332 and 334 may also be combined.

Further, it is understood that the method 300 may improve the functioning of a computer system itself. For example, the functioning of the retrieval server 106 and/or the generation server 108 of FIG. 1 may be improved by the method 300. For example, retrieval server 106 may be improved by the method 300 storing the first response 222, the first input query 212, and the first set of related queries 214 in the cache 200 such that the first response 222 is associated with the first input query 212 and the first set of related queries 214 because a second search may not need to be executed for later received queries, such as the second input query 216, which may mean that the retrieval server 106 utilizes less computing power in a RAG system such as the system 100. Utilizing the cache 200 to generate responses may avoid redundant searches and may provide a low-latency, in-memory solution compared to traditional RAG systems. Rather than searching the knowledge base 114 and/or the third-party servers 109, the retrieval model 116 can pull from the cache 200 which requires less computational power. As a result, for at least some input queries, the latency between receiving an input query and providing a response may be several seconds faster by utilizing the cache 200.

Also, the method 300 may improve the technical field of retrieval augmented generation. Populating the cache 200 with generated queries such as the first set of related queries 214 along with the input queries and associating the queries with relevant responses allows for enhanced retrieval of responses. Typically, an AI model such as the AI model 118 has a lower latency between receiving an input query and generating a response by itself than an AI model does in a RAG system. The AI model by itself relies on training data alone while the AI model in a RAG system supplements the training data by retrieving external information responsive to the query, which typically requires searching through large amounts of information such as in the knowledge base 114. This additional searching may take several seconds longer to generate a response than the AI model would by itself. However, in the disclosed embodiments, the generative capability of the AI model 118 may be leveraged to pre-populate the cache 200 with generated queries based on received queries to enhance the speed at which responses are provided to the client device 104 while maintaining response accuracy. Thus, for at least some input queries, the searching process may be forgone allowing the RAG system to provide responses to input queries with comparable latency to a traditional generative AI model. As a result, the query is provided with the accuracy of a RAG system, but at the speed of a traditional AI model.

FIG. 4 illustrates an example computer system that may be employed in retrieval augmented generation. In some embodiments, the computer system 400 may be part of any of the systems or devices described in this disclosure. For example, the computer system 400 may be part of any of the client device 104, the retrieval server 106, the generation server 108, and/or the third-party servers 109a-109n.

The computer system 400 may include a processor 402, a memory 404, a file system 406, a communication unit 408, an operating system 410, a user interface 412, and an application 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, a retrieval-augmented generation system such as the system 100, or any other computer system.

Generally, the processor 402 may include any suitable special-purpose or general-purpose computer, computing entity, or processing device including various computer hardware or software applications and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the methods disclosed herein.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the methods disclosed herein. These computer-executable instructions may be included, for example, in the operating system 410, in one or more applications, such as the artificial intelligence application 112, in one or more models, such as the retrieval model 116, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The application 414 may be one or more computer-readable instructions stored on one or more non-transitory computer-readable media, such as the memory 404 or the file system 406, that, when executed by the processor 402, is configured to perform one or more of the actions of the methods disclosed herein. In some embodiments, the application 414 may be part of the operating system 410 or may be part of an application of the computer system 400, or may be some combination thereof. In some embodiments, the application 414 may function as the artificial intelligence application 112.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software applications, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

What is claimed is:

1. A computer-implemented method for retrieval augmented generation, the method comprising:
    receiving a first input query from a client device;
    generating a first set of related queries based on the first input query, each related query in the first set of related queries being a variation of the first input query;
    executing a search to generate a first response to the first input query;
    storing the first response, the first input query, and the first set of related queries in a cache, wherein the first response is associated with the first input query and the first set of related queries;
    providing, in response to receiving the first input query, the first response to the client device;
    receiving a second input query from the client device or a different client device; and
    determining that the second input query matches at least one of the first input query or a related query in the first set of related queries stored in the cache.

2. The computer-implemented method of claim 1, further comprising:
    providing, in response to receiving the second input query, the first response without executing a second search.

3. The computer-implemented method of claim 1, further comprising:
    receiving a third input query from the client device or a different client device;
    determining that the third input query does not match the first input query and any of the related queries in the first set of related queries stored in the cache;
    generating a second set of related queries based on the third input query, each related query in the second set of related queries being a variation of the third input query; and
    executing a second search to generate a second response to the third input query.

4. The computer-implemented method of claim 3, further comprising:
    comparing the second response to the first response;
    determining that the second response provides information that is the same as the first response;
    storing the third input query and the second set of related queries in the cache, wherein the first response is associated with the third input query and the second set of related queries; and
    providing, in response to receiving the third input query, the first response or the second response.

5. The computer-implemented method of claim 3, further comprising:
    comparing the second response to the first response;
    determining that the second response provides information that is different than the first response;
    storing the second response, the third input query, and the second set of related queries in the cache, wherein the second response is associated with the third input query and the second set of related queries; and
    providing, in response to receiving the third input query, the second response.

6. The computer-implemented method of claim 1, further comprising:
    determining that the first response is current; and providing, in response to receiving the second input query, the first response without executing a second search.

7. The computer-implemented method of claim 6, wherein the determination that the first response is current is based on a determination that a reference location has not been updated, the reference location being a source of information utilized to generate the first response.

8. The computer-implemented method of claim 6, wherein the determination that the first response is current is based on a determination that a reference location has not expired, the reference location being a source of information utilized to generate the first response.

9. The computer-implemented method of claim 1, further comprising:
    determining that the first response is not current;
    executing a second search to generate an updated first response to the second input query;
    storing the updated first response in the cache, wherein the updated first response is associated with the first input query and the first set of related queries stored in the cache; and
    providing, in response to receiving the second input query, the updated first response.

10. One or more non-transitory computer-readable media comprising one or more computer-readable instructions that, when executed by one or more processors of a computing device, cause the computing device to perform a method for retrieval augmented generation, the method comprising:
    receiving a first input query from a client device;
    generating a first set of related queries based on the first input query, each related query in the first set of related queries being a variation of the first input query;
    executing a search to generate a first response to the first input query;
    storing the first response, the first input query, and the first set of related queries in a cache, wherein the first response is associated with the first input query and the first set of related queries;
    providing, in response to receiving the first input query, the first response to the client device;
    receiving a second input query from the client device or a different client device; and
    determining that the second input query matches at least one of the first input query or a related query in the first set of related queries stored in the cache.

11. The one or more non-transitory computer-readable media of claim 10, wherein the method further comprises:
    providing, in response to receiving the second input query, the first response without executing a second search.

12. The one or more non-transitory computer-readable media of claim 10, wherein the method further comprises:
    receiving a third input query from the client device or a different client device;
    determining that the third input query does not match the first input query and any of the related queries in the first set of related queries stored in the cache;
    generating a second set of related queries based on the third input query, each related query in the second set of related queries being a variation of the third input query; and
    executing a second search to generate a second response to the third input query.

13. The one or more non-transitory computer-readable media of claim 12, wherein the method further comprises:
    comparing the second response to the first response;

determining that the second response provides information that is the same as the first response;

storing the third input query and the second set of related queries in the cache, wherein the first response is associated with the third input query and the second set of related queries; and providing, in response to receiving the third input query, the first response or the second response.

14. The one or more non-transitory computer-readable media of claim 12, wherein the method further comprises:

comparing the second response to the first response;

determining that the second response provides information that is different than the first response;

storing the second response, the third input query, and the second set of related queries in the cache, wherein the second response is associated with the third input query and the second set of related queries; and providing, in response to receiving the third input query, the second response.

15. The one or more non-transitory computer-readable media of claim 10, wherein the method further comprises:

determining that the first response is current; and providing, in response to receiving the second input query, the first response without executing a second search.

16. The one or more non-transitory computer-readable media of claim 10, wherein the method further comprises:

determining that the first response is not current;

executing a second search to generate an updated first response to the second input query;

storing the updated first response in the cache, wherein the updated first response is associated with the first input query and the first set of related queries stored in the cache; and providing, in response to receiving the second input query, the updated first response.

17. A computing device comprising:

one or more processors; and one or more non-transitory computer-readable media comprising one or more computer-readable instructions that, when executed by the one or more processors, cause the computing device to perform a method for retrieval augmented generation, the method comprising:

receiving a first input query from a client device;

generating a first set of related queries based on the first input query, each related query in the first set of related queries being a variation of the first input query;

executing a search to generate a first response to the first input query;

storing the first response, the first input query, and the first set of related queries in a cache, wherein the first response is associated with the first input query and the first set of related queries;

providing, in response to receiving the first input query, the first response to the client device;

receiving a second input query from the client device or a different client device; and determining that the second input query matches at least one of the first input query or a related query in the first set of related queries stored in the cache.

18. The computing device of claim 17, wherein the method further comprises providing, in response to receiving the second input query, the first response without executing a second search.

19. The computing device of claim 17, wherein the method further comprises:

receiving a third input query from the client device or a different client device;

determining that the third input query does not match the first input query and any of the related queries in the first set of related queries stored in the cache;

generating a second set of related queries based on the third input query, each related query in the second set of related queries being a variation of the third input query;

executing a second search to generate a second response to the third input query;

comparing the second response to the first response;

determining that the second response provides information that is the same as the first response;

storing the third input query and the second set of related queries in the cache, wherein the first response is associated with the third input query and the second set of related queries; and providing, in response to receiving the third input query, the first response or the second response.

20. The computing device of claim 17, wherein the method further comprises:

receiving a third input query from the client device or a different client device;

determining that the third input query does not match the first input query and any of the related queries in the first set of related queries stored in the cache;

generating a second set of related queries based on the third input query, each related query in the second set of related queries being a variation of the third input query;

executing a second search to generate a second response to the third input query;

comparing the second response to the first response;

determining that the second response provides information that is different than the first response;

storing the second response, the third input query, and the second set of related queries in the cache, wherein the second response is associated with the third input query and the second set of related queries; and providing, in response to receiving the third input query, the second response.

* * * * *